UNITED STATES PATENT OFFICE.

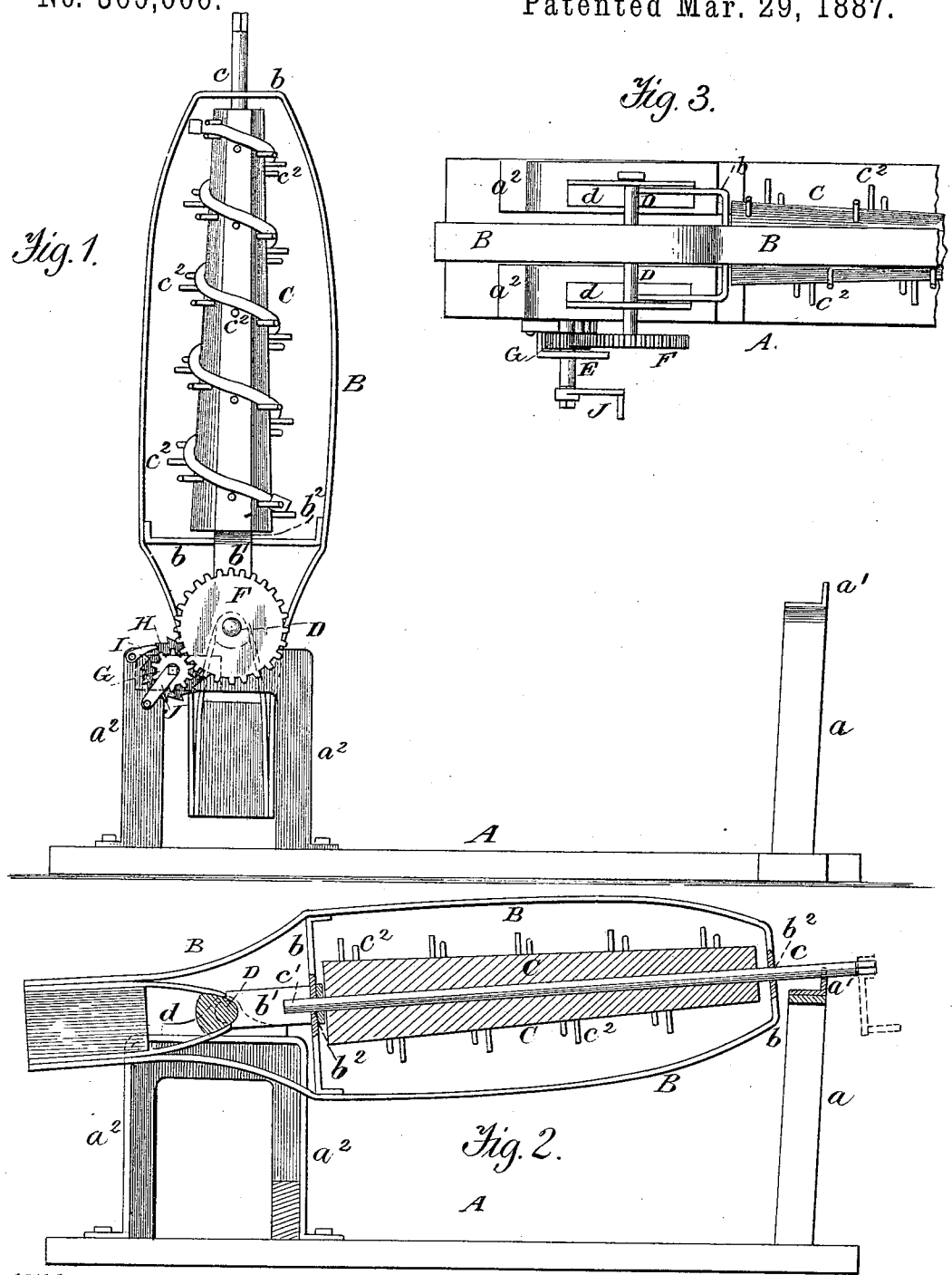

CHARLES H. FAVEL AND CHARLIE A. FAVEL, OF OBERLIN, OHIO.

HOSE STORING AND DRYING DEVICE.

SPECIFICATION forming part of Letters Patent No. 360,006, dated March 29, 1887.

Application filed January 12, 1887. Serial No. 224,142. (No model.)

*To all whom it may concern:*

Be it known that we, CHARLES H. FAVEL and CHARLIE A. FAVEL, citizens of the United States, residing at Oberlin, in the county of Lorain and State of Ohio, have invented certain new and useful Improvements in Hose Storing and Drying Device; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to disclose to the public means by which the hose used by fire departments, on lawns, and in gardens may be so stored away that they will be certainly and thoroughly relieved of moisture, while they may be used for spraying or for fountains without removal from their supporting-frame.

Figure 1 of the drawings is a side elevation to show the reel in a perpendicular position; Fig. 2, a longitudinal vertical section showing the reel supported in a horizontal position, and Fig. 3 a plan view.

In the drawings, A represents the reel-frame, having a transverse upright, $a$, at one end, with the bearing $a'$ upon its top, and at the other end two longitudinally-arranged uprights, $a^2$ $a^2$. Between these is carried the reel-holder B, which has in the top and at the intersection of the cross-pieces $b$ $b'$ the bearings $b^2$, in which the reel-journals $c$ $c'$ may rotate. The downwardly-bent cross-piece $b$ is made fast at its lower ends to the shaft D, which turns in bearings $d$ $d$ and carries the reel C from a vertical to a horizontal position or the reverse. When the reel is horizontal, its long journal $c$ is supported in the bearing $a'$ upon the transverse upright $a$. The lower end of the reel-holder may be weighted, so as to partially balance and more easily raise or lower it.

The shaft D is connected with a hand-shaft, E, by the spur-wheel F and pinion G, while the shaft E is provided with a ratchet-wheel, H, into which works a pivoted gravity pawl or detent, I. While the latter is thrown back the reel may be raised or lowered by operating the hand-crank J, and when the reel is in the desired position the detent is put upon the ratchet.

We provide our reel with teeth, which are arranged in one continuous row spirally about its periphery, so as to support the hose on an incline when the reel stands upright. In this way as the hose rests upon the teeth $c^2$ it will permit the escape of all water and allow the hose to be thoroughly dried.

We prefer to taper the reel from the bottom upwardly, so as to throw the greatest weight of hose near the bottom.

With our invention one man can back the reel-cart into proper position, attach the end of the hose to the reel, and then, by means of the hand-crank J, transfer the hose thereto. He can then with the crank and gear-wheels raise the reel into its desired perpendicular position.

By our device we manage to store away a great deal of hose in a small space, and so that all the water will be sure to leave it.

What we claim as new, and desire to protect by Letters Patent, is—

In a hose-reel, the combination, with a supporting-frame, holder pivoted to turn on one side, and a reel, C, of the shafts D E, spur-wheel F, pinion G, ratchet-wheel H, and detent I, all arranged substantially as shown and described.

In testimony whereof we affix our signatures in presence of two witnesses.

CHARLES H. FAVEL.
CHARLIE A. FAVEL.

Witnesses:
J. H. LANG,
WILLIE CAMP.